United States Patent [19]
Ikegaya et al.

[11] Patent Number: 5,088,841
[45] Date of Patent: Feb. 18, 1992

[54] SEAT ARRANGEMENT FOR AUTOMOTIVE VEHICLE WITH SEAT POSITION ADJUSTING SYSTEM

[75] Inventors: Isao Ikegaya; Tadashi Matsumoto, both of Shizuoka, Japan

[73] Assignee: Fuji Kiko Company, Limited, Tokyo, Japan

[21] Appl. No.: 442,679

[22] Filed: Nov. 29, 1989

[30] Foreign Application Priority Data

Nov. 30, 1988 [JP] Japan .................................. 63-303274
Feb. 27, 1989 [JP] Japan ...................................... 1-45717

[51] Int. Cl.⁵ .................................................. A47C 1/02
[52] U.S. Cl. ...................................... 297/344; 248/394; 297/330
[58] Field of Search ...................... 297/344, 330, 394; 248/394

[56] References Cited

U.S. PATENT DOCUMENTS

| | | | |
|---|---|---|---|
| 3,335,995 | 8/1967 | Pickles | 248/394 |
| 3,437,303 | 4/1969 | Pickles | 248/394 |
| 4,073,459 | 2/1978 | Pickles | 248/394 |
| 4,141,583 | 2/1979 | Klüting et al. | 297/344 X |
| 4,209,159 | 6/1980 | Becker et al. | 297/344 X |
| 4,299,316 | 11/1981 | Reinmoeller | 297/330 X |
| 4,432,583 | 2/1984 | Russo et al. | 248/394 X |
| 4,629,254 | 12/1986 | Stolper | 297/344 |

Primary Examiner—Peter A. Aschenbrenner
Attorney, Agent, or Firm—Ronald P. Kananen

[57] ABSTRACT

A power seat arrangement has concentrically arranged drives for a seat slide mechanism, a seat lifter mechanism and a reclining mechanism in a space defined in the vicinity of one rear end corner of a seat cushion.

7 Claims, 17 Drawing Sheets

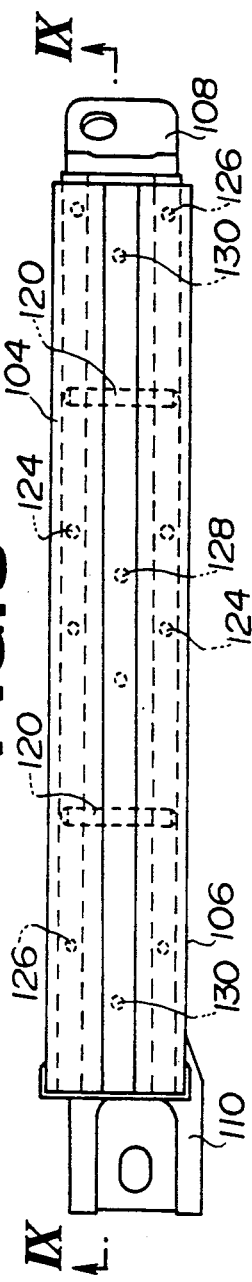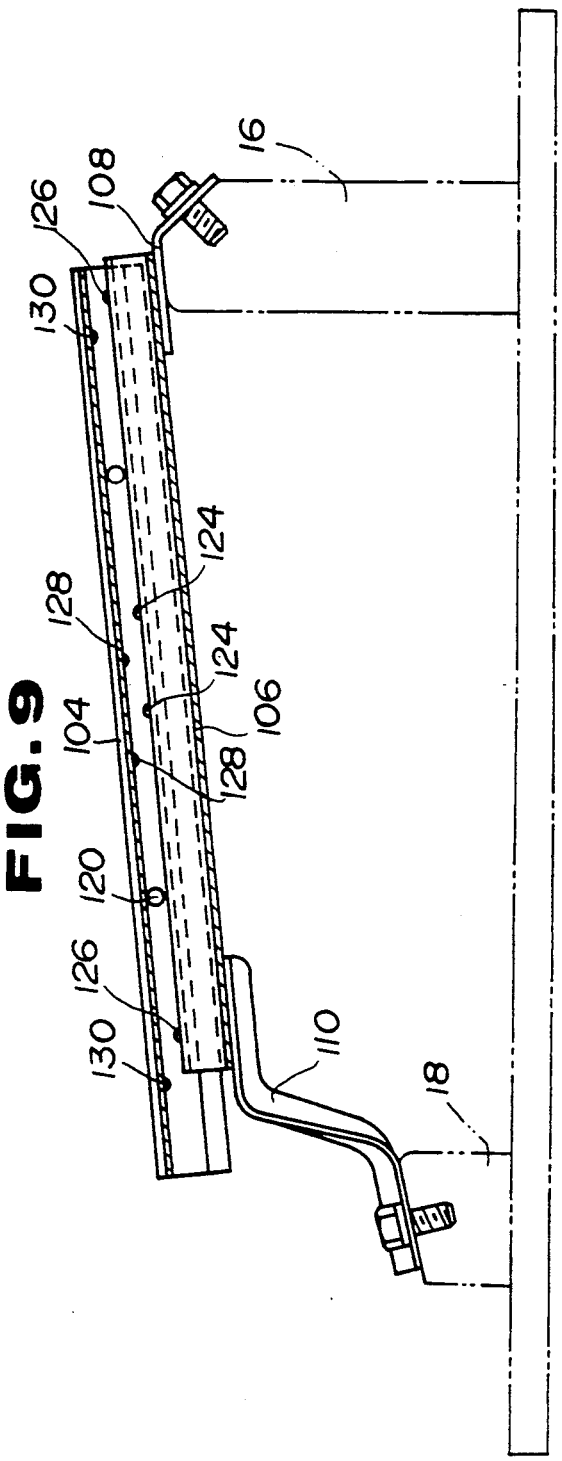

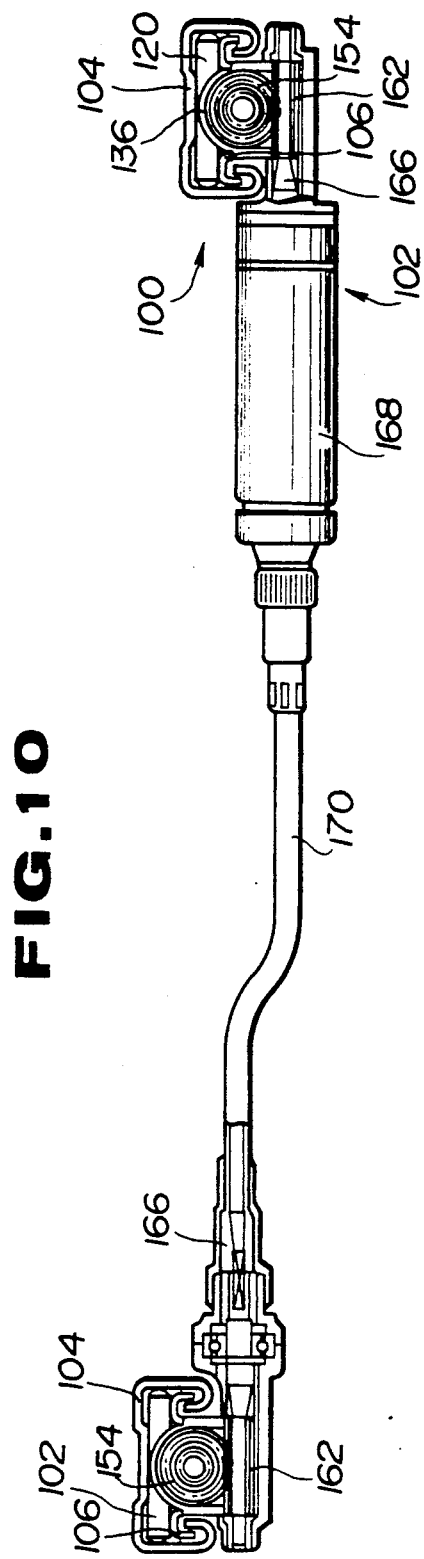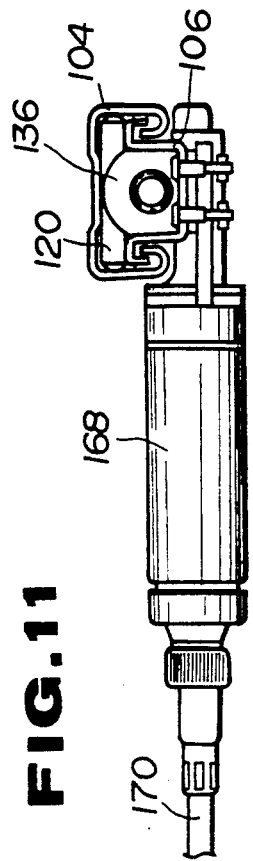

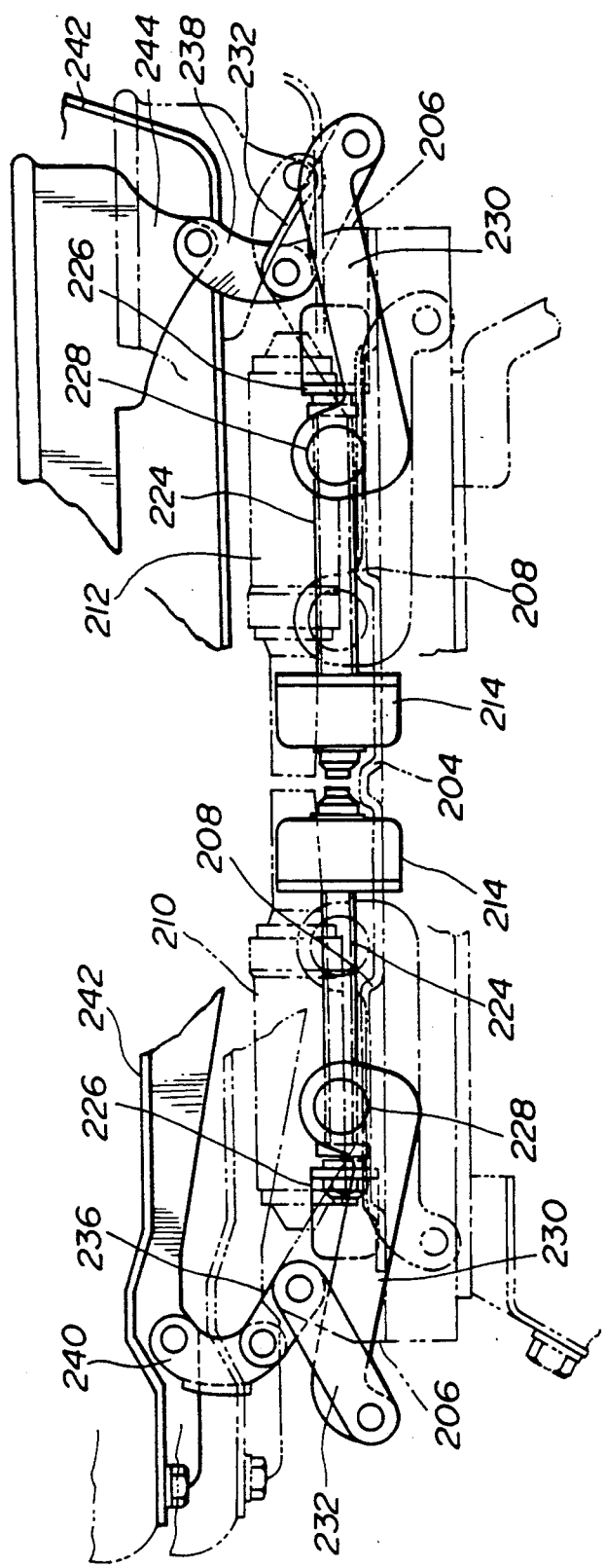

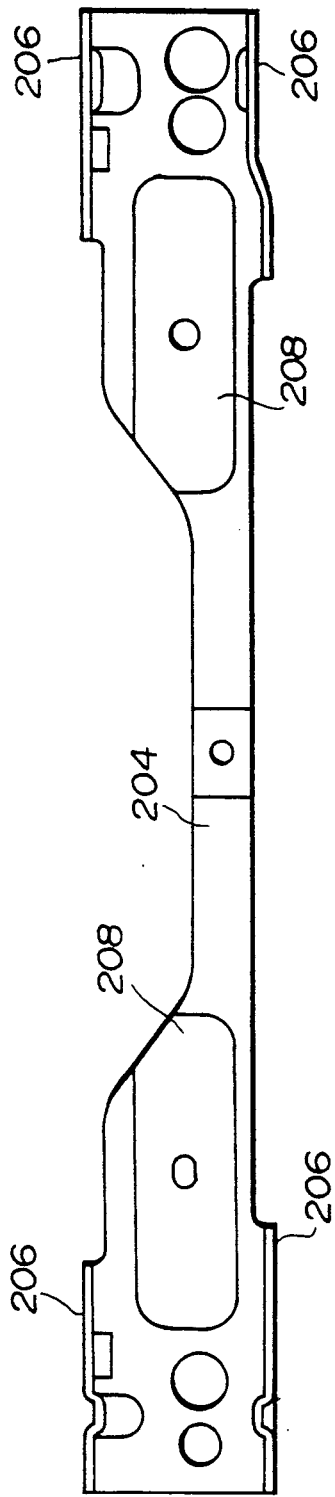

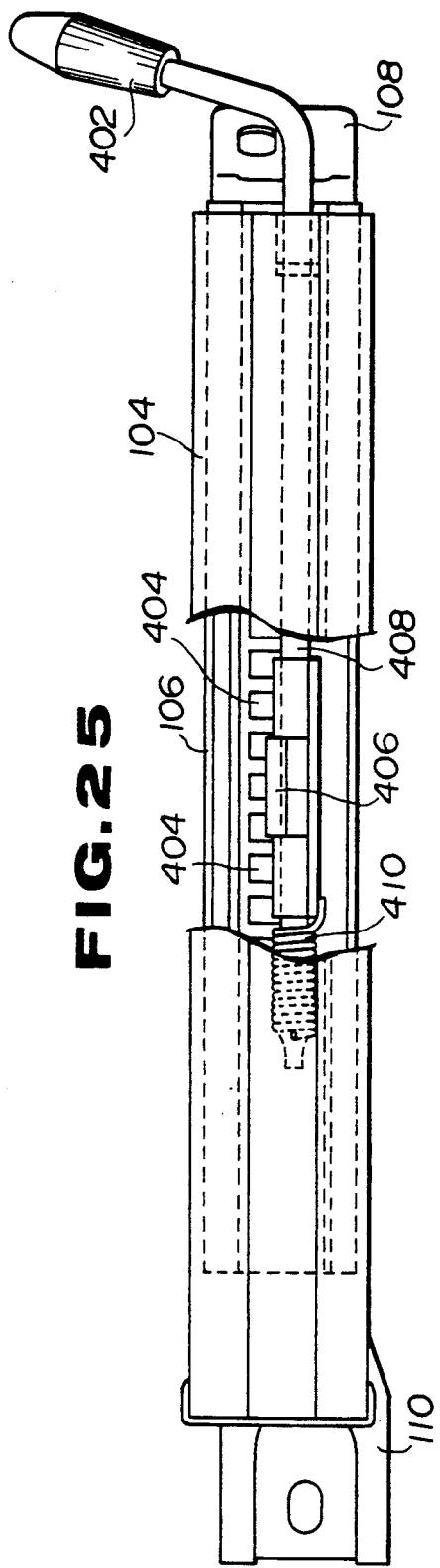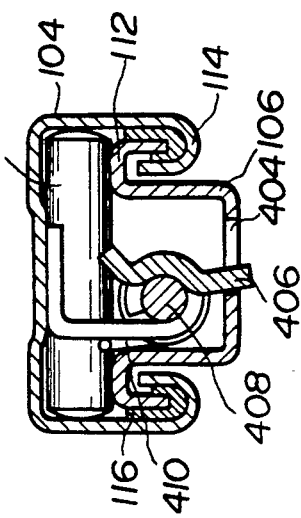
FIG. 25
FIG. 26

SEAT ARRANGEMENT FOR AUTOMOTIVE VEHICLE WITH SEAT POSITION ADJUSTING SYSTEM

BACKGROUND OF THE INVENTION

1. Field of the Invention

The present invention relates generally to a seat arrangement for an automotive vehicle. More specifically, the invention relates to a seat position adjusting system for an automotive power seat which is less bulky, thereby facilitating installation in a vehicular cabin.

2. Description of the Background Art

Automotive power seat arrangements have been provided in various automotive vehicles for convenience of adjusting seat positions, such as seat slide position, seat cushion height position, seat back reclining position and so forth. In order to facilitate various seat position adjusting functions, the power seat arrangement is provided various seat position adjusting mechanisms, such as a seat slide mechanism, a seat lifter mechanism, reclining mechanism and so forth. These adjusting mechanisms are driven by driving means such as electric motors. The driving mechanisms are provided in the vicinity of the associated adjusting mechanisms. Since quite limited space is available around the vehicular seat to place the driving means, difficulty is encountered in placing the driving means.

It is general practice to place the driving means beneath the seat cushion of the seat. This clearly requires enough height or space beneath the seat cushion. As a result, the height of the seat cushion is prevented from being smaller. On the other hand, in certain types of vehicles, it is preferred to have the seat position of the vehicular occupant as low as possible. In such cases the driving means placed beneath the seat cushion acts as a limit preventing the seat cushion from being satisfactorily lowered.

SUMMARY OF THE INVENTION

Therefore, it is an object of the present invention to provide a power seat arrangement for an automotive vehicle which is compact enough for solving the problems set forth above.

Another object of the invention is to provide an improved layout of various adjusting mechanisms around the seat.

In order to accomplish the aforementioned and other objects, in a power seat arrangement, according to the present invention, driving means for a seat slide mechanisms, a seat lifter mechanism are concentrically arranged and a reclining mechanism in a space defined in the vicinity of one rear end corner of a seat cushion. According to one aspect of the invention, an adjustable automotive seat arrangement including a seat cushion and a seat back comprises:

a seat slide mechanism associated with the seat cushion for permitting axial shifting in forward and rearward directions, the seat slide mechanism including a seat slide rail structure having a stationary rail secured to a vehicular body structural member and a movable rail slidingly engaged with the stationary rail and secured to a structural member of the seat cushion, the movable rail being associated with a first driving means for driving the movable rail relative to the stationary rail;

a seat lifter mechanism associated with the seat cushion for adjusting the height position of the seat cushion, the seat lifter mechanism including a stationary framework connected to a seat cushion frame of the seat cushion via a link mechanism, the seat lifter mechanism including a second driving means associated with the link mechanism for driving the link mechanism for causing vertical movement of the seat cushion frame relative to the stationary framework;

a reclining mechanism associated with the seat back for adjusting a reclining angle thereof, the reclining mechanism having a pivotal base associated with the rear end portion of the seat cushion frame for pivotal movement thereabout, the reclining mechanism including a third driving means associated with the pivotal base for pivotally driving the latter; and the seat arrangement defining a space along one lateral side of the seat cushion and defined by the seat cushion and the seat slide rail structure for concentrically receiving the first, second and third driving means for compact layout thereof.

The seat slide mechanism may include a threaded shaft secured to the movable rail and disposed within the internal space between the movable rail and the stationary rail, a stationary block having a gear element having gear teeth meshing with the threaded shaft and a power train for transmitting rotational driving torque of the first driving means to the gear element for rotatingly driving the latter.

The seat slide rail structure includes means for establishing three point support for slidingly supporting the movable rail on the stationary rail for smooth sliding movement of the movable rail relative to the stationary rail. The movable rail and the stationary rail may be provided with overlapping sections extending along both lateral sides, and the three point support is established by means of a roller bearing contacting with mating faces of the movable rail and the stationary rail and low frictional sliders disposed between the movable and stationary rails at the the overlapping sections. Preferably, at least one of the movable and stationary rails is provided with stopper projections for restricting range of motion of the roller bearings. The first and second roller bearings are disposed between the movable and stationary rails, and the stopper projections comprise a first pair of projections associated with the first roller bearing for restricting the motion range of the first roller bearing within a predetermined range within a front half of the stationary rail and a second pair of projections associated with the second roller bearing for restricting the motion range of the second roller bearing within a predetermined range within a rear half of the stationary roller.

According to another aspect of the invention, a seat slide mechanism for an automotive seat arrangement comprises:

a stationary rail secured to a vehicular body structural member;

a movable rail slidingly engaged with the stationary rail and secured to a structural member of the seat cushion; and means for establishing three point support for slidingly supporting the movable rail on the stationary rail for smooth sliding movement of the movable rail relative to the stationary rail.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 8 is a plan view of a seat slide rail of the preferred construction of the seat slide mechanism of FIG. 5;

FIG. 9 is a section taken along line IX—IX of FIG. 8;

FIG. 10 is a section taken along line X—X of FIG. 5;

FIG. 11 is a section taken along line XI—XI of FIG. 5;

FIG. 21 is a side elevation of the preferred construction of a seat lifter mechanism employed in the preferred embodiment of the power seat arrangement;

FIG. 22 is a plan view of a ring bracket employed in the seat lifter mechanism of FIG. 21;

FIG. 23 is a side elevation of a ring bracket employed in the seat lifter mechanism of FIG. 21;

FIG. 25 is a plan view of the seat slide mechanism of FIG. 24; and

FIG. 26 is a cross section of the seat slide mechanism of FIG. 24.

DESCRIPTION OF THE PREFERRED EMBODIMENT

Figure 1:
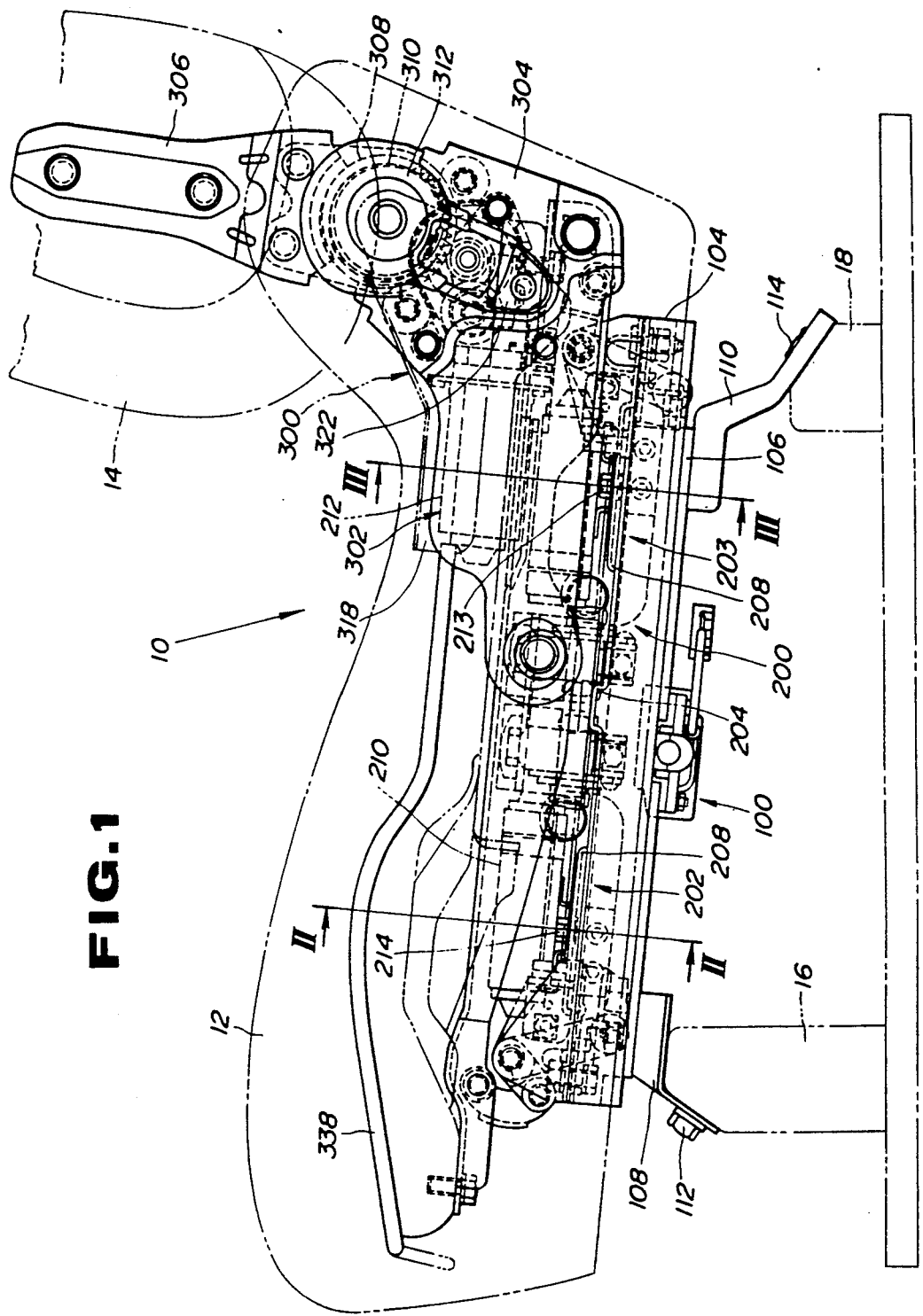
FIG. 1 is a side elevation of the preferred embodiment of an automotive power seat arrangement according to the present invention.
Figure 2:
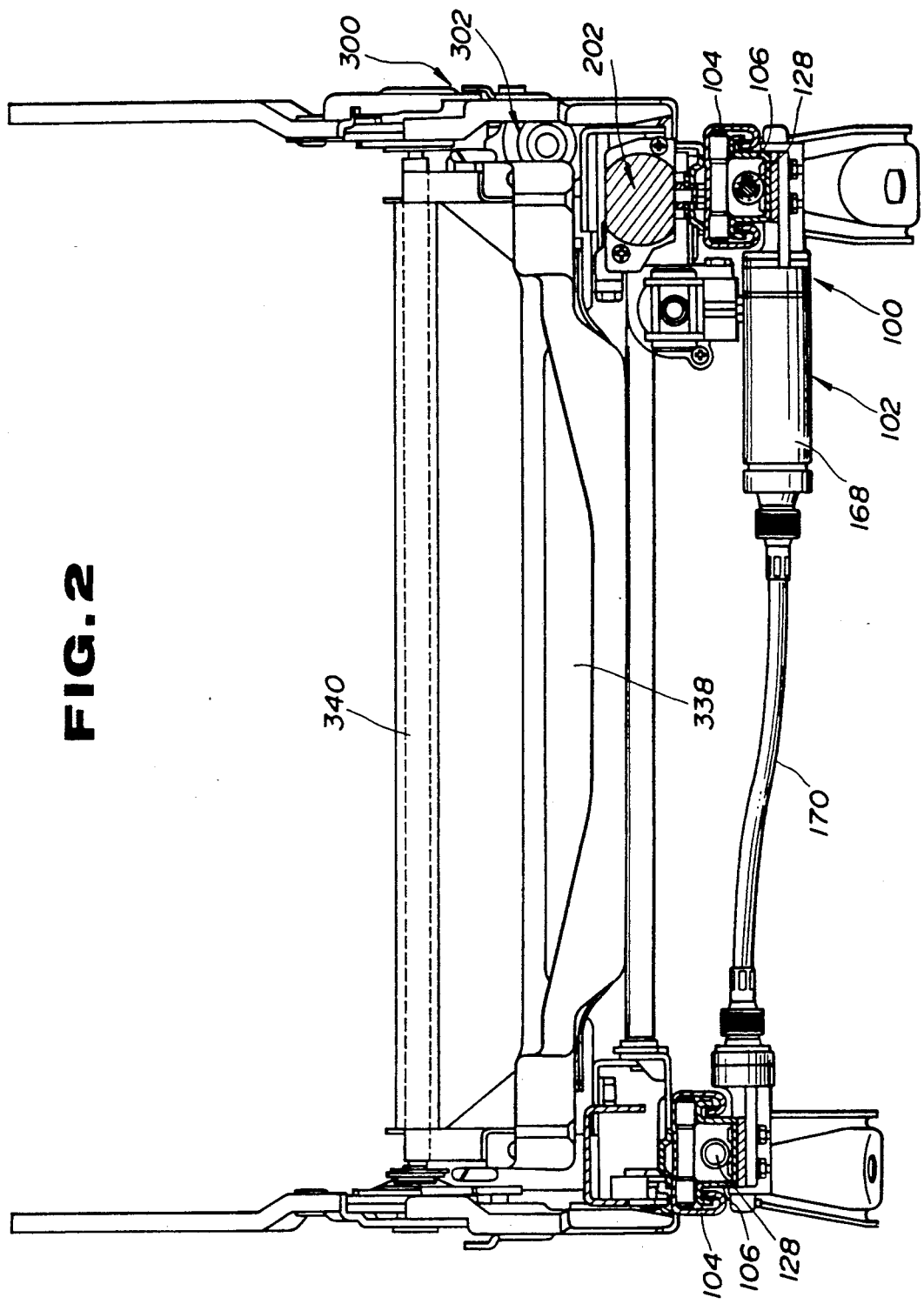
FIG. 2 is a section taken along line II—II of FIG. 1.
Figure 3:
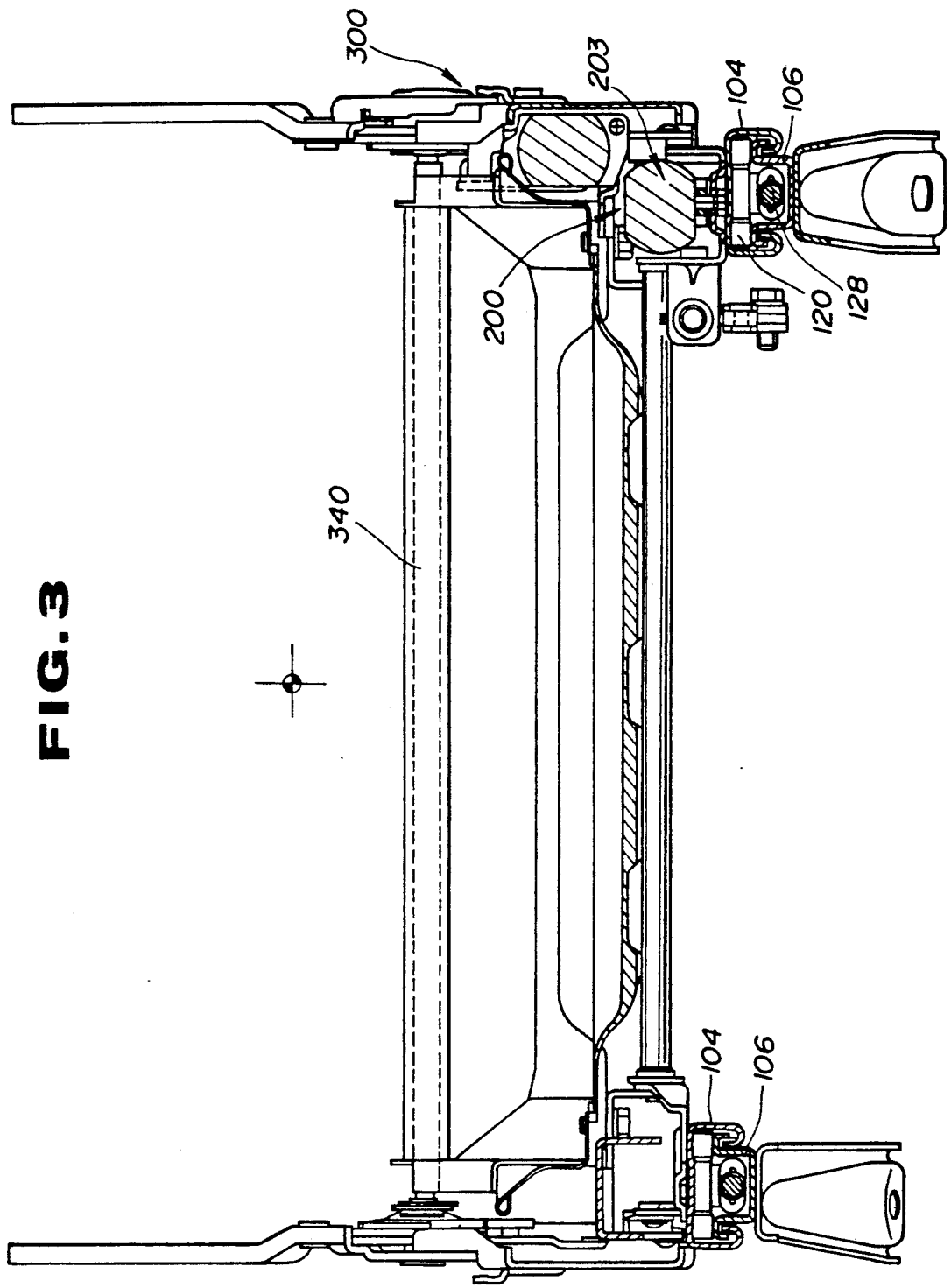
FIG. 3 is a section taken along line III—III of FIG. 1.

Referring now to the drawings, particularly to FIGS. 1 through 4, the preferred embodiment of power seat arrangement according to the present invention, includes a power seat slide mechanism 100, a power seat lifter mechanism 200 and a power reclining mechanism 300. The seat slide mechanism 100 is designed for shifting a vehicular seat 10 in forward and backward directions. The seat lifter mechanism 200 is designed for vertically shifting a seat cushion 12 of the seat 10. The reclining mechanism 300 is designed for adjusting the angular position of a seat back 14 relative to the seat cushion 12. The seat slide mechanism 100 is associated with a seat slide drive system which is generally represented by the reference numeral 102. The seat lifter mechanism 200 is associated with seat lifter drive systems 202 and 203. Similarly, the seat back reclining drive system 302 is provided for the reclining mechanism 300.

The seat slide mechanism 100 has a pair of guide rail structures extending substantially in parallel to the longitudinal axis of the vehicle body. Each of the guide rail structure includes an upper rail 104 and a lower rail 106. The lower rail 106 is stationarily secured onto cross members 16 and 18 of the vehicular body framework by means of brackets 108 and 110 which are rigidly secured to the cross members by means of the fastening bolts 112 and 114. On the other hand, the upper rail 106 is rigidly fixed to a seat frame of the seat cushion 12 for movement therewith. The upper rail 106 is slidably engaged with the lower rail 104 for axial movement in forward and backward directions.

Figure 6:
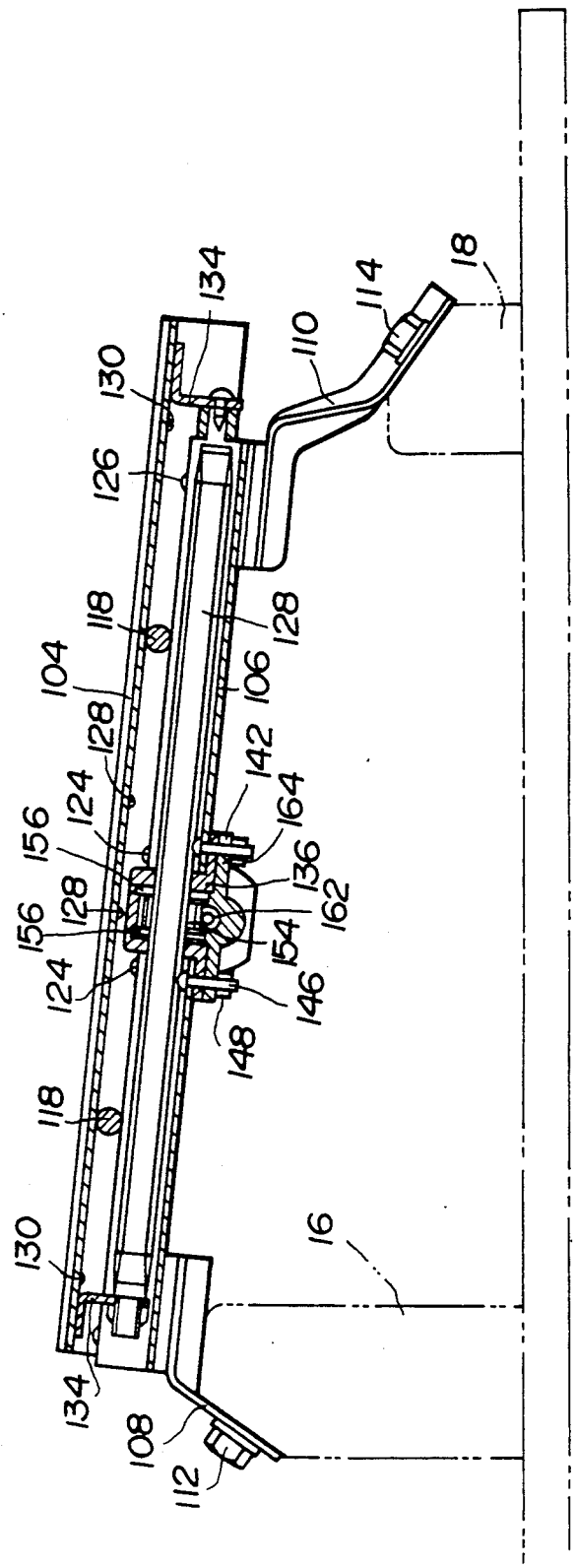
FIG. 6 is a section taken along line VI—VI of FIG. 5.
Figure 7:
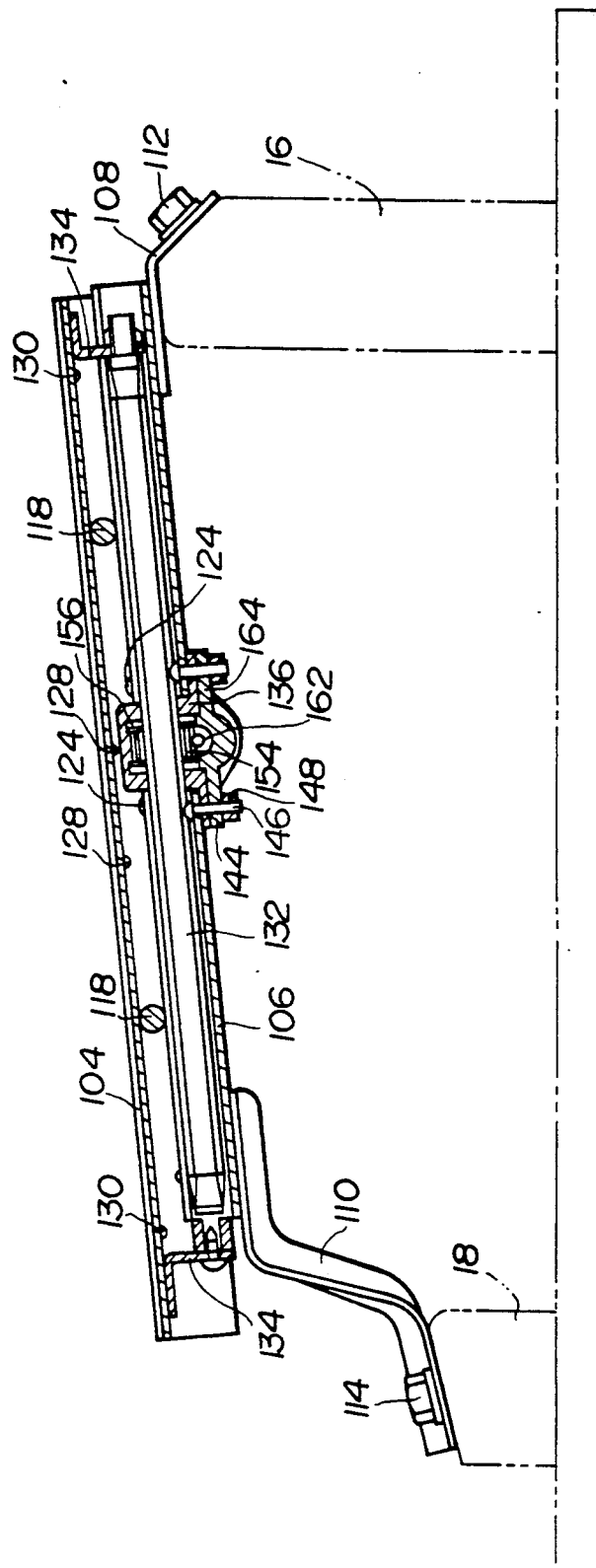
FIG. 7 is a section taken along line VII—VII of FIG. 5.
Figure 12:
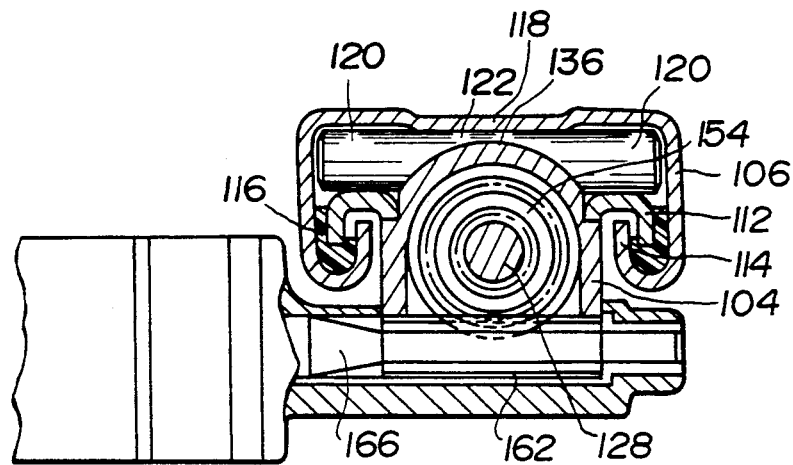
FIG. 12 is an enlarged section showing a major part of FIG. 10.
Figure 13:
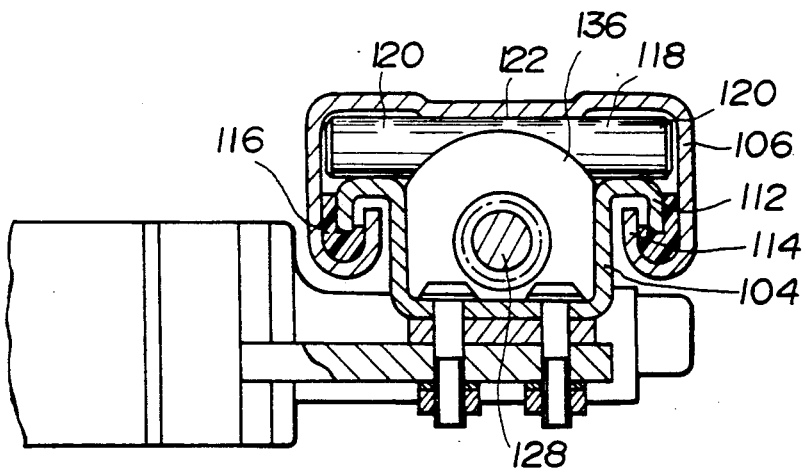
FIG. 13 is an enlarged section showing a major part of FIG. 11.

As can be particularly seen from FIGS. 12 and 13, the lower rail 106 is generally of channel shaped cross section to have a pair of curled flange sections 112 which extend longitudinally along the upper end of a channel shaped major section. On the other hand, the upper rail 104 is provided with curled flange sections 114. A slider 116 formed of a self-lubricating or low friction material, such as a synthetic resin, is secured to each of the flange section 114 of the upper rail 104. The slider 116 is placed in contact with the inner face of the associated flange section 112 of the lower rail 106. A pair of roller bearings 118 is disposed in the internal space defined by the upper and lower rails 104 and 106. Each roller bearing 118 has side portions 120 contacting the upper edge of the lower rail 106 and a smaller diameter center portion 122 contacting the lower face of the stepped down center portion of the horizontally extending section of the upper rail 106. A pair of stopper projections 124 is formed in the vicinity of longitudinal center portion of the lower rail 106. These stopper projections 124 restrict movement of the roller bearing 118 so that one of the roller bearings 118 is oriented in the front half section of the lower rail 106 and the other roller bearing is oriented in the rear half section, as shown in FIGS. 6 and 7. Another pair of stopper projections 126 is provided in the vicinity of front and rear ends of the lower rail 106 for preventing the bearing rollers 118 from being lost through the axial ends. The upper rails 104 are also provided with projections 128 in the vicinity of the longitudinal center and at and orientation corresponding to that of the projections 124 of the lower rail 106 when the upper rail 104 is placed at the initial position. The upper rail 104 is also provided with projections 130 at orientations corresponding to those of the projections 126 when the lower rail 106 is placed at the initial position. These projections 128 and 130 cooperate with the projections 124 and 126 of the lower rails 106 so as to restrict the range of movement of the roller bearings 118. The slider 116 and the roller bearings 118 assure smooth movement of the upper rail 104 relative to the lower rail 106.

Figure 17:
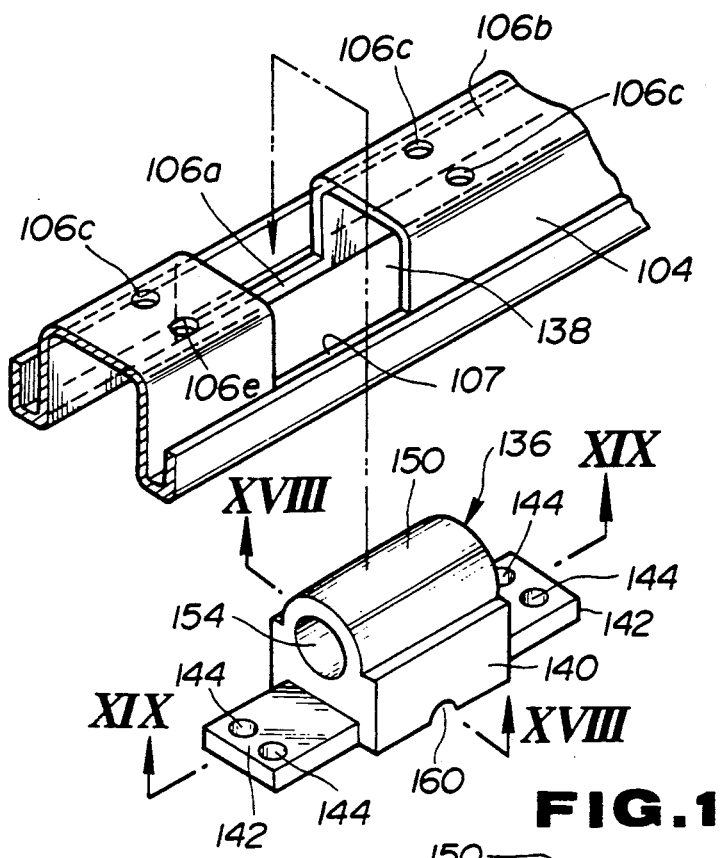
FIG. 17 is an exploded perspective illustration of the seat slide guide structure employed in the seat slide mechanism of FIG. 5.
Figure 18:
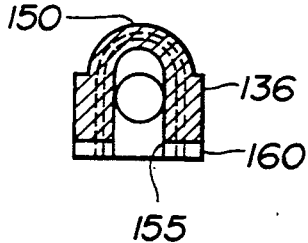
FIG. 18 is a section taken along line XVIII—XVIIII of FIG. 17.
Figure 19:
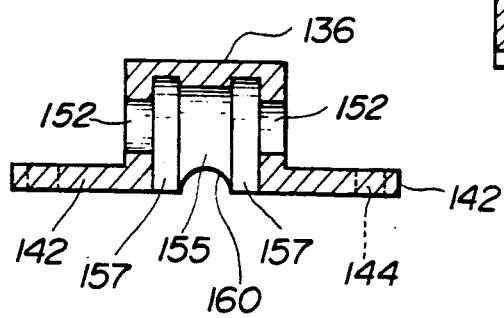
FIG. 19 is a section taken along line XIX—XIX of FIG. 17.

A screw shaft 128 extends through the center portion of the lower rail 106. The screw shaft 132 is secured to the upper rail 104 at both ends thereof by means of brackets 134. Therefore, the screw shaft 128 is movable relative to the lower rail 106 together with the upper rail 104. The screw shaft 128 extends through a nut block 136 which is fixed to the lower rail 106. As can be seen from FIGS. 6 and 7, the nut block 136 is longitudinally oriented between the stopper projections 124. As shown in FIG. 17, the nut block 136 is received in the lower rail 106 through a cut-out 138. Vertically extending wall sections 140 of the nut block 136 are adapted to firmly contact vertical wall sections 106a of the lower rail 106. The nut block 136 also has a pair of longitudinally extending flanges 142 which are to be placed in mating engagement with a lower surface of a horizontal wall section 106b, with holes 144 aligning with holes 106c formed through the horizontal wall section 106b of the lower rail 106. The nut block 136 is rigidly secured onto the lower rail 106 by means of bolts 146 and nuts 148. The nut block 136 has a round top portion 150 through which a bore 152 is defined. A nut 154 (FIGS. 6, 7, 10 and 12) is loosely disposed within the bore for threadingly engaging the screw shaft 128 so that the nut may rotate relative to the bore. The nut 154 is received within a lower end open groove 155 formed on the inner periphery of the bore 152 and further restricted axial movement by means of thrust bearings 156 at both axial sides thereof, which thrust bearings 156 are received in lower end open groove 157.

The vertical wall sections 140 of the nut block 136 are each formed with a sectionally semi-circular shaped groove 160 which is in communication with the groove 155. Through the groove 160, a worm gear 162 is received. The worm gear 162 engages with a thread formed on the outer periphery of the nut 154. The worm gear 162 is supported in engagement with the thread on the outer periphery of the nut 154 by means of a bearing member 164.

Figure 5:
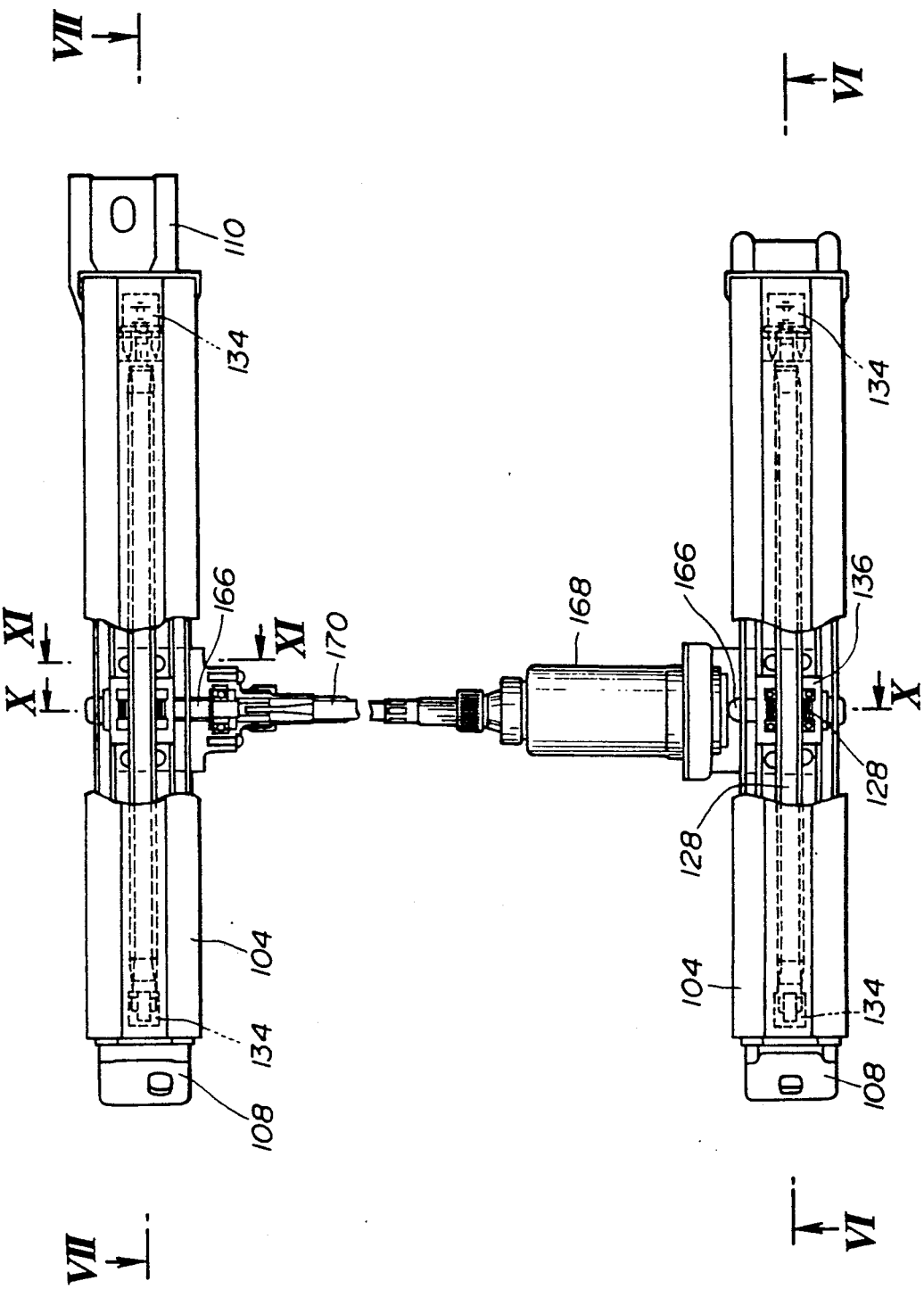
FIG. 5 is a plan view of the preferred construction of a seat slide mechanism employed in the preferred embodiment of the automotive power seat arrangement of the invention.

Each worm gear 162 is mechanically connected to an output shaft 166 of an electric motor 168 which serves as the seal slide driving means as shown in FIG. 5. The electric motor 168 comprises a reversible motor so as to be driven in forward and backward directions for driving the worm gear 162 accordingly. One of the output shafts 166 is oriented at a position remote from the motor 168 is connected to the motor via a flexible shaft 170.

Figure 14:
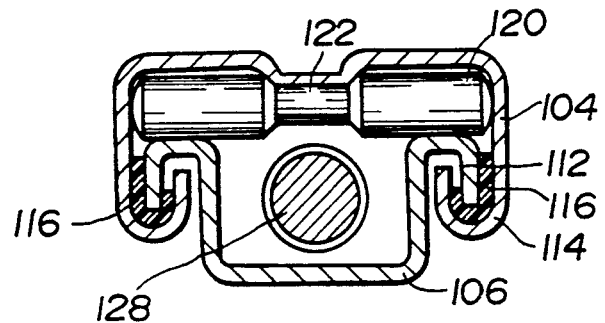
FIGS. 14, 15 and 16 are sections respectively showing modifications of the seat slide guide structure to be employed in the preferred construction of the power seat arrangement.
Figure 15:
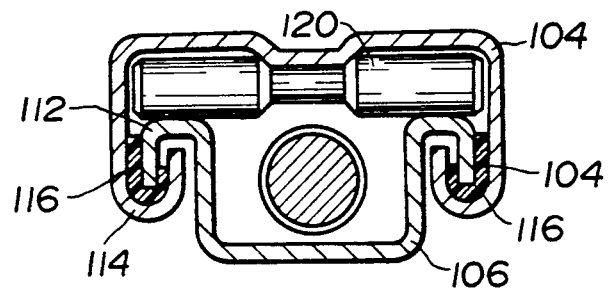
Figure 16:
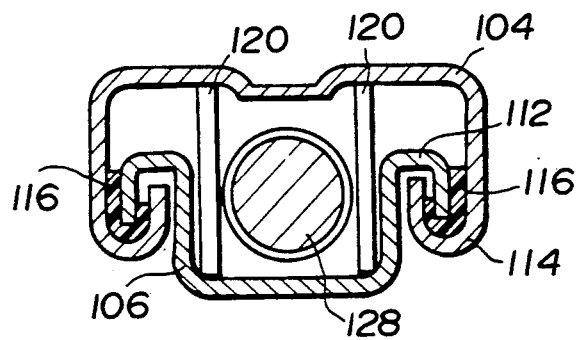

It should be appreciated that the configuration of the upper rail 104 and the roller bearings 118 can be modified in various ways. Examples are shown in FIGS. 14, 15 and 16.

Figure 4:
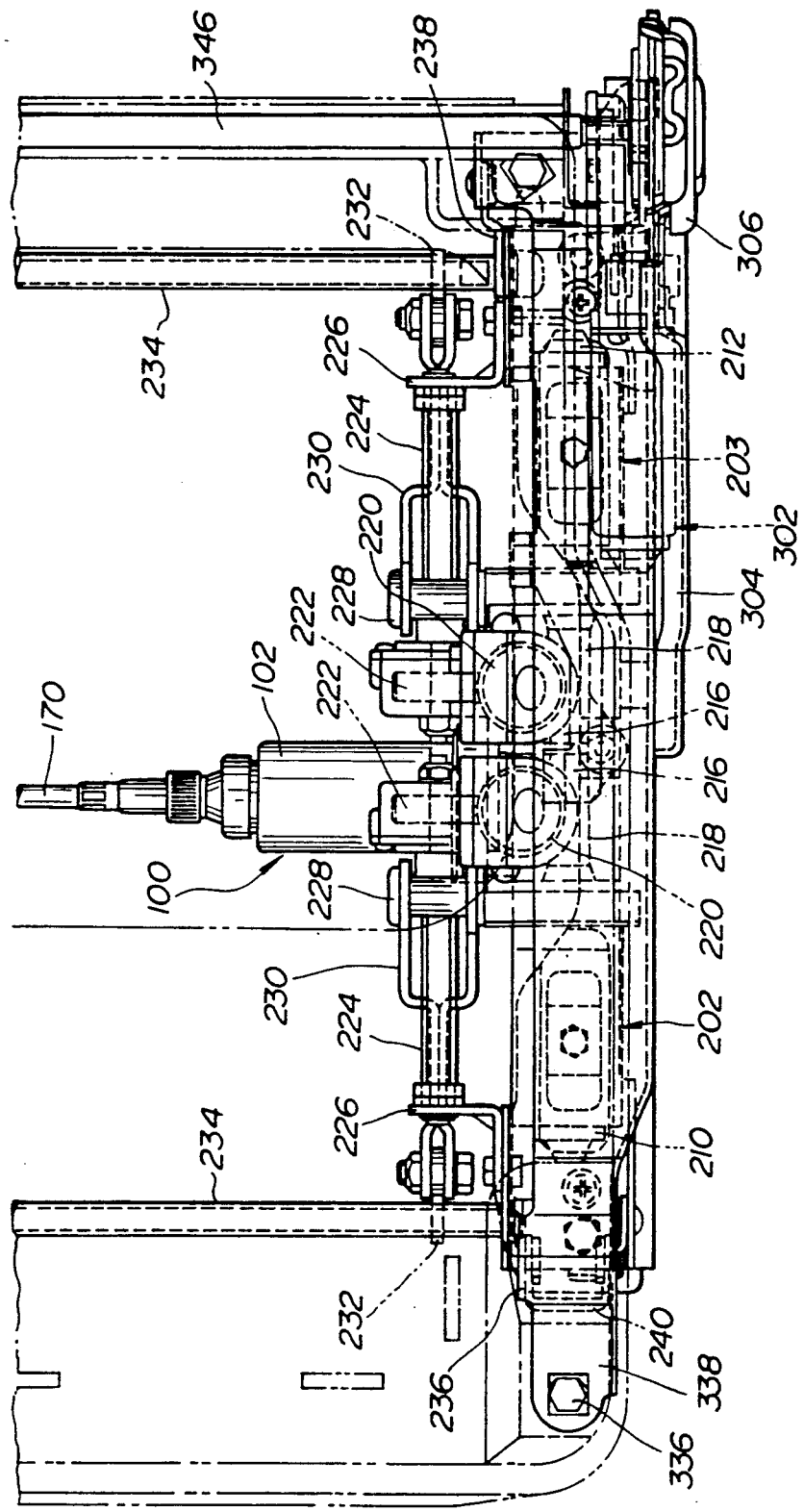
FIG. 4 is a partial plan view of the the preferred embodiment of the automotive power seat arrangement of FIG. 1.

The seat lifter mechanism 200 includes ring brackets or support frame members 204 respectively mounted on the upper rails 104 and secured on the top thereof by means of fastening bolts as shown in FIG. 21. The support frame member 204 defines a motor receptacle space between vertical wall sections 206. The horizontal section of the motor receptacle space is bent upwardly to form motor supports 208. Electric motors 210 and 212 are fixed on the motor supports 208 by means of fastening bolts 213. As can be seen from FIG. 1, the electric motors 210 and 212 are arranged in axial alignment to each other. Each of the electric motors 210 and 212 is associated with a worm gear unit 214. As shown in FIG. 4, the worm gear units 214 have worm gears 216 secured onto output shaft 218 of the each electric motor 210 and 212. The worm gear 216 meshes with a worm wheel 220, which is in turn associated with a gear train including gears 222. The gears 222 are firmly secured on respectively opposing ends of screw shafts 224. Each screw shaft 224 is rotatably supported by means of a bracket 226. A nut block 228 is engaged with the screw shaft 224 for axial movement according to rotation of the latter. The nut block 228 is connected to a yoke shaped link member 230. The link member 230 is pivotably connected to the nut block 228 at one end for pivotal movement thereabout. On the other hand, the link member 230 is pivotally connected to one end of an intermediate link member 232. The other end of the intermediate link member 232 is rigidly connected to a coupling lever 234 which is rotatably supported on the support frame member 204. Links 236 and 238 are rigidly secured onto both ends of the coupling lever 234 at a predetermined angular relationship thereto. The link 236 is oriented in the vicinity of the front end of the seat and pivotally connected to one end of a link 240, the other end of which is pivotally connected to the seat frame 242. On the other hand, the link 238 has the other end pivotally connected to the downward extension 244 of the seat frame 242. As will be appreciated, the link mechanisms are provided at both sides of the seat and cooperate with each other via the coupling levers 234 for assuring synchronous operation according to the position of the nut blocks 228 relative to the screw shafts 224.

Figure 20:
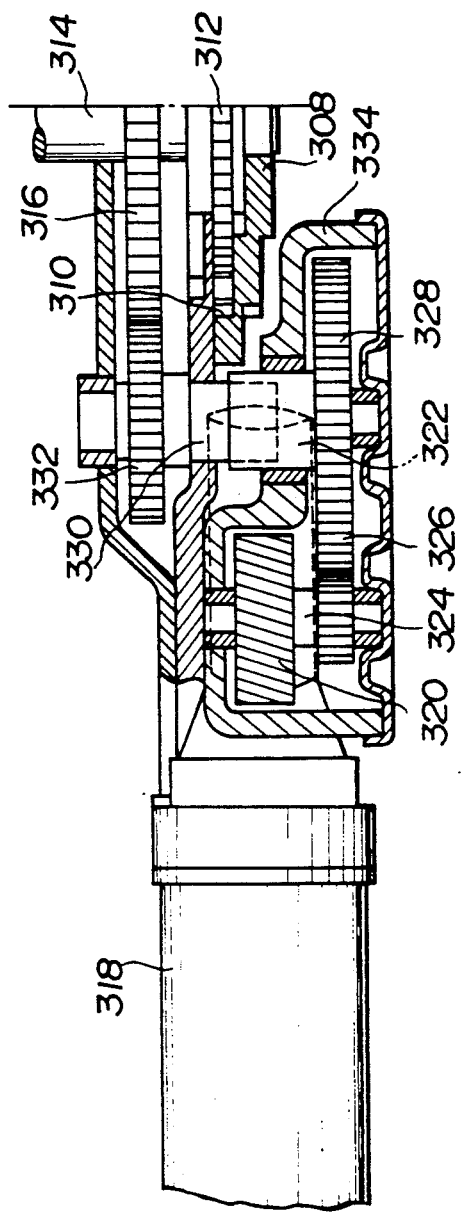
FIG. 20 is a section showing a major part of a seat back reclining mechanism in the preferred embodiment of the power seat arrangement.

The seat back reclining mechanism 300 includes base plates 304 respectively fixed to the rear end of the seat frame 242. To each of the base plates, a back arm 306 is pivotally connected, as shown in FIGS. 1 and 4. The back arm 306 has a lower end portion 308 formed with an internal gear 310, about which an eccentric gear 312 having external gear teeth is meshed. The eccentric gear 312 is rotatably driven for eccentrically driving the internal gear and thereby pivotally drives the back arm 306 for gradually adjusting the reclining angle of the seat back. As shown in FIG. 20, the eccentric gear 312 is supported by a gear shaft 314 which is rotatable together with the eccentric gear. A driver gear 316 is also secured on the gear shaft 314 for rotation therewith. The driver gear 316 is designed to be driven by the driving torque of an electric motor 318 transmitted through a gear train. The gear train includes a worm gear 320 which meshes with a worm gear 322 rigidly secured to the output shaft of the motor 318 in order to convert the rotating direction. The worm gear 320 is secured to a rotary shaft 324. A small diameter gear 326 is also secured on the rotary shaft 324. The smaller diameter gear 326 meshes with a larger diameter gear 328 which is secured on a rotary shaft 330. A transmission gear 332 is secured to the rotary shaft 330 for rotation therewith. The transmission gear 332 is drivingly engaged with the drive gear 316. With the shown gears, a speed reduction gear train is formed. Therefore, the driving torque of the electric motor 318 is transmitted to the back arm 306 with a reduced speed.

The gear train set forth above is housed within a gear train housing 334 which rotatably supports the rotary shafts 324 and 330. The electric motor 318 is received within a motor receptacle 336 of a seat pan 338.

As will be appreciated, the seat back reclining mechanisms are provided on both sides of the seat. This pair of reclining mechanisms cooperate through a connecting rod 340 which assures synchronous operation of both of the reclining mechanisms.

In the shown construction, the electric motors 168, 210, 212 and 318 are respectively connected to a seat slide switch, a seat lifter switch and a reclining switch arranged in the vicinity of the seat for permitting adjustment of the seat position.

When the seat slide switch is operated, electric power is supplied to the electric motor 168 for driving the latter in forward or reverse direction according to the desired shifting direction of the seat. Rotation of the output shaft 166 of the electric motor 168 is transmitted to the worm gear 162. According to rotation of the worm gear 162, the nut 154 is rotatingly driven to cause axial movement of screw shaft 128 with respect to the nut block 136. Since the screw shaft 128 is rigidly secured to the upper rail 104, the upper rail with the seat is axially driven for adjusting the seat slide position.

During the seat slide operation set forth above, smooth movement of the upper rail 104 relative to the lower rail 106 is assured by the roller bearing 120 and the slider blocks 116. The projections 124 and 126 of the lower rail 106 and the projections 128 and 130 are cooperative with the roller bearing 120 for serving as stoppers for restricting forward and backward movement of the upper rail relative to the lower rail.

On the other hand, when the seat lifter switch is operated, the electric motors 210 and 212 are operated in unison or independently of each other. The electric motors 210 and 212, as driven, drive the worm gears 220 via the worm gear 222. The warm gear 220 transmits the driving torque of the associated one of the electric motors 210 and 212 to the associated one of the screw shafts 224. Since the nut block 228 is engaged to the screw shaft 224 and held stationarily, rotation of the screw shaft causes axial movement thereof. As a result, respective links 230, 232, 236, 238 and 240 are thus pivotally driven for causing vertical movement of the seat frame 242 relative to the support frame member 204 for adjusting the vertical position of the seat.

Furthermore, when the electric motor 318 is driven for adjusting the reclining position of the seat back, the driving torque is transmitted to the drive gear 316 via the gear train set forth above. Accordingly, the eccentric gear 312 is rotatingly driven for eccentrically driving the internal gear 310 of the back arm 306. As a result, the back arm 306 causes angular displacement of the seat back 14. Therefore, adjustment of the seat back reclining position can be performed.

As can be seen from the discussion hereabove, in the present invention, the seat slide mechanism 100, the seat lifter mechanism 200 and the reclining mechanism 300 are concentrically arranged along the side of the vehicular seat with concentration of the electric motors as driving means at one side of the seat. Particularly, as can be seen clearly from FIGS. 2 and 4, since all of the driving mechanisms for, respectively, the seat slide mechanism 100, the seat lifter mechanism 200 and the reclining mechanism 300 are placed within an essentially triangular space defined between the seat frame and the seat slide rail structure, required space becomes small enough that it allows the seat cushion position to be satisfactorily lowered.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

Figure 24:
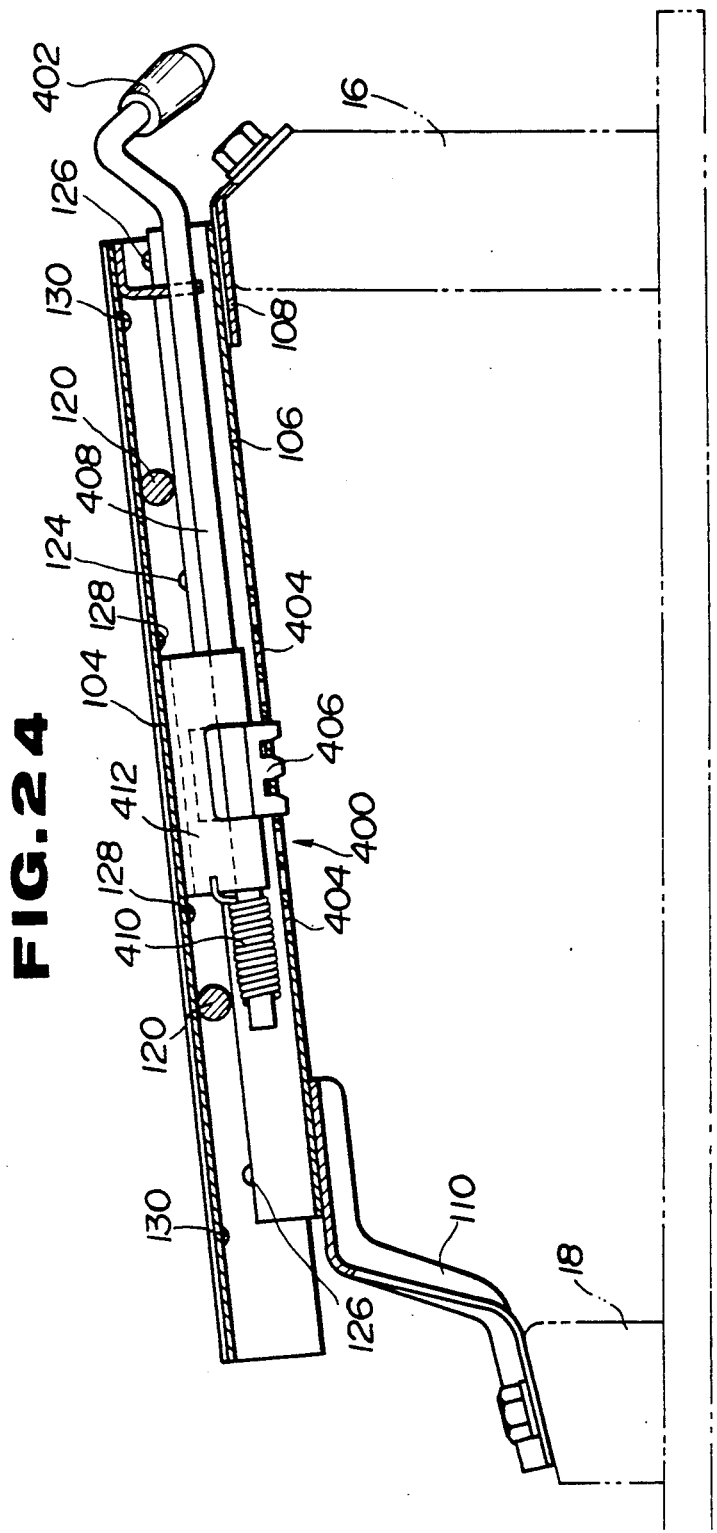
FIG. 24 is a section of a manually operable seat slide mechanism which employs a seat slide lock structure equivalent to that of the preferred embodiment of the power seat arrangement.

For example, though the shown embodiment is directed to a power seat arrangement, part of the shown embodiment is also applicable for a seat position adjusting system for manual operation. For instance, the seat slide structure is particularly applicable for a manually operable seat slide structure. FIGS. 24 through 26 show the seat slide mechanism adapted for manual operation. In the following disclosure of the shown manual seat slide mechanism, the structural elements corresponding to the elements disclosed in the former embodiment will be represented by the same reference numerals and the detailed discussion will be omitted in order to avoid redundant discussion. The shown manual seat slide structure is differentiated from the former embodiment in the absence of the electric motor powered seat slide drive mechanism and in the presence of the seat slide lock structure 400 with a lock release handle 402. As can be seen, the seat slide lock structure 400 comprises a plurality of locking holes 404 formed through the lower rail 106 and a locking pawl 406 which is rigidly secured on an actuation rod 408. In order to normally establish locking engagement between the locking pawl 406 and the locking hole 404, the actuation rod 408 is resiliently biased in a locking direction by means of a locking spring 410. In the shown embodiment, the locking spring 410 comprises a torsion spring.

The actuation rod 408 is disposed within the internal space of the seat slide rail structure defined between the upper and lower rails 104 and 106 and rotatably supported therein by means of a support bracket 412 secured on the upper rail.

The seat slide rail structure in this example is substantially the same as that of the former embodiment and establishes three point support between the upper and lower rails 104 and 106 by the resin slider 116 and the roller bearing 120. Therefore, even when the shown seat slide rail structure is applied to the manual seat slide structure, it still allows smooth movement of the upper rail relative to the lower rail.

What is claimed is:

1. An adjustable automotive seat arrangement including a seat cushion and a seat back comprising:
   a seat slide mechanism associated with said seat cushion for permitting axial shifting in forward and rearward directions, said seat slide mechanism including seat slide rail structure having a stationary rail secured to a vehicular body structural member and a movable rail slidingly engaged with said stationary rail and secured to a structural member of said seat cushion, said movable rail being associated with a first driving means for driving said movable rail relative to said stationary rail;
   a seat lifter mechanism associated with said seat cushion for adjusting the height position of said seat cushion, said seat lifter mechanism including a stationary framework connected to a seat cushion frame of said seat cushion via a link mechanism, said seat lifter mechanism including a second driving means associated with said link mechanism for driving the link mechanism for causing vertical movement of said seat cushion frame relative to said stationary framework;

a reclining mechanism associated with said seat back for adjusting a reclining angle thereof, said reclining mechanism having a pivotal base associated with the rear end portion of said seat cushion frame for pivotal movement thereabout, said reclining mechanism including a third driving means associated with said pivotal base for pivotally driving the latter; and said seat arrangement defining a space along one lateral side of said seat cushion and defined by said seat cushion and said seat slide rail structure for concentrically receiving two electric motors, said two motors comprising said second driving means, for compact layout thereof.

2. An adjustable automotive seat arrangement as set forth in claim 1, wherein said seat slide mechanism includes a threaded shaft secured to said movable rail and disposed within the internal space between said movable rail and said stationary rail, a stationary block having a gear element having gear teeth meshing with said threaded shaft and a power train for transmitting rotational driving torque of said first driving means to said gear element for rotatingly driving the latter.

3. An adjustable automotive seat arrangement as set forth in claim 1, wherein said seat slide rail structure including means for establishing three point support for slidingly supporting said movable rail on said stationary rail for smooth sliding movement of said movable rail relative to said stationary rail.

4. An adjustable automotive seat arrangement as set forth in claim 3, wherein said movable rail and said stationary rail are provided overlapping sections extending along both lateral sides, and said three point support is established by means of a roller bearing contacting with mating faces of said movable rail and said stationary rail and low frictional sliders disposed between said movable and stationary rails at said said overlapping sections.

5. An adjustable automotive seat arrangement as set forth in claim 4, wherein at least one of said movable and stationary rails is provided with stopper projections for restricting range of motion of said roller bearings.

6. An adjustable automotive seat arrangement as set forth in claim 5, wherein first and second roller bearings are disposed between said movable and stationary rails and said stopper projections comprises a first pair of projections associated with said first roller bearing for restricting motion range of said first roller bearing within a predetermined range within a front half of said stationary rail and a second pair of projections associated with said second roller bearing for restricting motion range of said second roller bearing within a predetermined range within a rear half of said stationary roller.

7. An adjustable automotive seat arrangement as set forth in claim 1, wherein said two electric motors are positioned in said space in concentric relationship with one another.

* * * * *